United States Patent [19]

Nakata

[11] 4,174,575
[45] Nov. 20, 1979

[54] MEASURING INSTRUMENT

[75] Inventor: Kiyohiro Nakata, Kure, Japan

[73] Assignee: Kabushiki Kaisha Mitutoyo Seisakusho, Tokyo, Japan

[21] Appl. No.: 911,068

[22] Filed: May 31, 1978

[30] Foreign Application Priority Data

May 31, 1977 [JP] Japan .............................. 52-70413[U]

[51] Int. Cl.² .......................... G01B 3/18; G01B 5/00
[52] U.S. Cl. ................................................. 33/164 R
[58] Field of Search ............ 33/163, 165, 166, 164 R, 33/164 B, 164 C, 164 D

[56] References Cited

U.S. PATENT DOCUMENTS

| 672,622 | 4/1901 | Isherwood | 33/165 |
| 2,467,499 | 4/1949 | Sachtleber | 33/164 R |

FOREIGN PATENT DOCUMENTS 902571 12/1944 France .................................. 33/164 R Primary Examiner—Harry N. Haroian
Attorney, Agent, or Firm—Brisebois & Kruger

[57] ABSTRACT

A measuring instrument with two feeds for its spindle. A first sleeve is keyed to a second sleeve so the sleeves can move axially relative to each other but cannot rotate relative to each other. A spindle is threaded into the second sleeve and moves axially when its thimble is rotated to provide the first feed. A second thimble has a first thread engaging a thread of the first sleeve and a second thread engaging a thread of the second sleeve. Rotation of the second thimble moves the second sleeve and spindle axially to provide the second feed. The first and second threads can be selected to provide a fine feed or a coarse feed of the second sleeve and spindle.

8 Claims, 2 Drawing Figures 4,174,575

MEASURING INSTRUMENT

BACKGROUND OF THE INVENTION

The present invention relates to a measuring instrument with two feeds, which can be used for measuring the displacement of a movable stand of a table of a machine tool or a stage of a projector.

The conventional measuring instrument, as disclosed for instance in Ser. No. 716,649, is so constituted that the normal feed of the spindle includes only a single screw; but the single screw provides only a single definite feed, and is found inconvenient when a fine feed or coarse feed is desired.

SUMMARY OF THE INVENTION

A primary object of the present invention is a measuring instrument with two spindle feeds.

Another object of the present invention is a measuring instrument with both a coarse and a fine spindle feed.

Still another object of the present invention is a measuring instrument which permits precise fine feed of the spindle.

Still another object of the present invention is a measuring instrument which enables an extension of the movable range of the spindle without increasing the total length of the device.

These and other objects, features and advantages of the invention will become more apparent from the following detailed specification with reference to the attached drawings.

BRIEF DESCRIPTION OF THE ATTACHED DRAWINGS

FIG. 1 is a view in principal section of one embodiment of a measuring instrument of the present invention; and FIG. 2 is a view in section of another embodiment of a measuring instrument of the present invention.

DETAILED DESCRIPTION OF THE PREFERRED EMBODIMENTS

Figure 1:
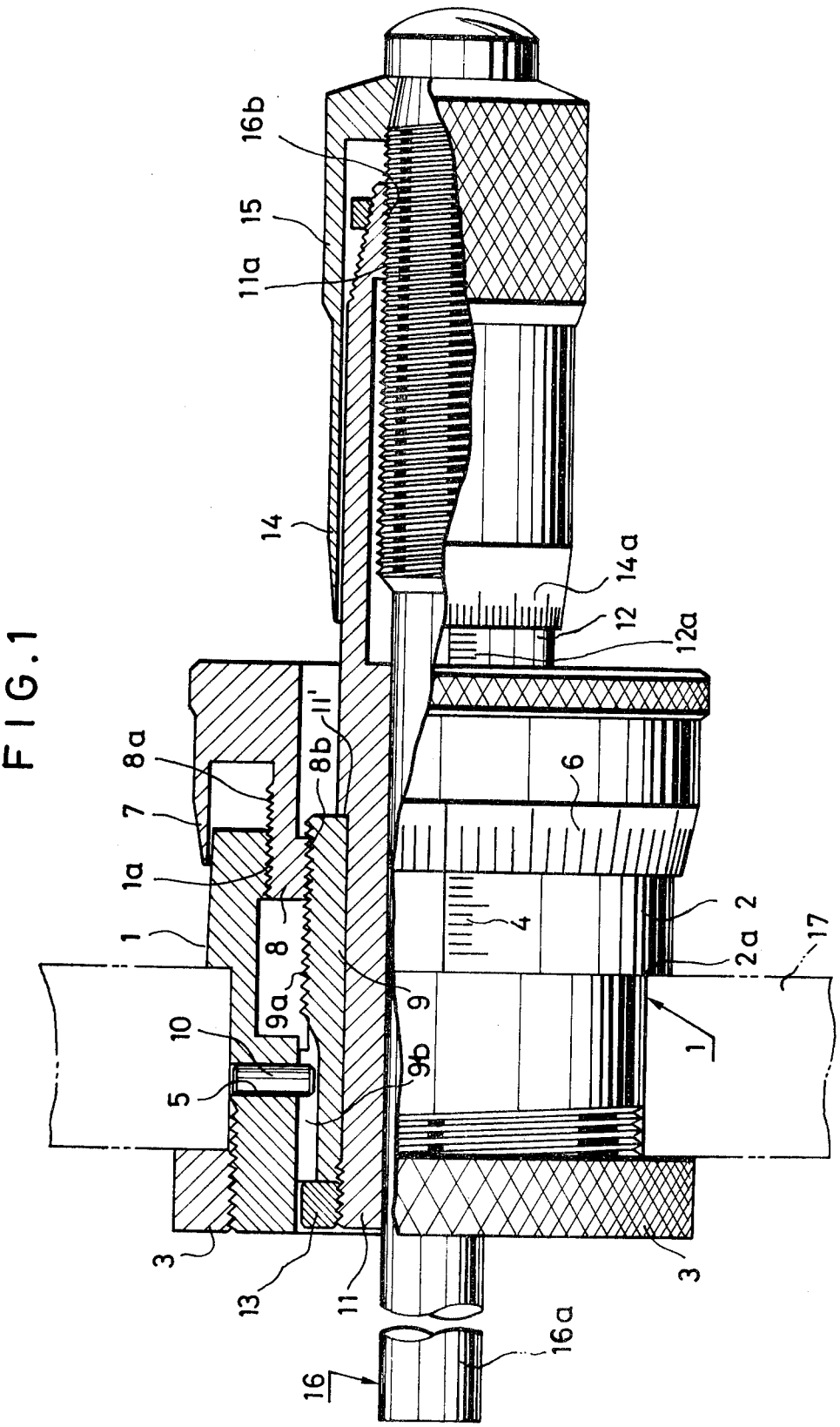

In FIG. 1 a first sleeve 1, has an enlarged cylindrical head 2. A nut 3 is screwed to the other end of the first sleeve 1. A scale for measurement 4 is provided along the longitudinal direction of the outer surface of head 2. A pin-retaining opening 5 is bored radially in the first sleeve 1. A first thimble 7 having scale for measurement 6 along its circumferential direction is rotatable around the head 2. A cylinder 8 is provided coaxially with the first thimble 7 and constitutes part of the thimble 7. A male screw thread 8a is formed on the outside surface of cylinder 8 as a fourth thread, while a female screw thread 8b is formed on the inside surface of cylinder 8 as a fifth thread. The threads 8a, 8b are right-hand threads. The thread 8a has a slightly larger pitch than the thread 8b. The male or first thread 8a of this cylinder 8 engages a mating female thread 1a on the inside surface of, and at one end of the first sleeve 1. The female or second thread 8b of cylinder 8 mates with and engages the male thread 9a as the second screw thread of the cylinder 9 which constitutes part of the second sleeve. A slender key groove 9b formed on the outside surface of cylinder 9 extends in the axial direction of cylinder 9. Within this key groove 9b there is a rotation-restricting key pin 10 pressed into the pin-retaining hole 5 and this pin 10 prevents relative rotation of the first sleeve 1 and the cylinder 9, but allows relative axial displacement between the sleeve and the cylinder. The cylinder 9 is fitted to the outer circumference of a second sleeve 11 and is fastened to between a shoulder 11' of the second sleeve 11 and a nut 13 screwed on the other end of the second sleeve 11. Said cylinder 9 is integrated with the second sleeve 11.

A second thimble 14 with an integral knob 15 is rotatable around the rearward end of second sleeve 11. 16 is a spindle with a stem 16a and a thread 16b threaded into a third thread 11a formed in the second sleeve 11 to allow the spindle 16 to freely move with respect to the second sleeve 11. Second thimble 14 with the knob 15 is fixed to the threaded end of this spindle 16.

To the frame 17 shown by two dot-chain line of an instrument such as an optical projector is fastened the first sleeve 1 in such a state that the stepped portion 2a of the head 2 is in contact with one side of the frame 17 and the other side of the sleeve 1 is pressed by the nut 3.

Now the action of the measuring instrument according to the present invention which is fitted to frame 17 will be described.

When the knob 15 is rotated right (thread 16b is right-hand thread), the thimble 14 turns right around the head 12 and moves axially left in FIG. 1, thereby rotating spindle 16 and moving the spindle to the left through the sleeve 11. When the knob 15 is rotated left, thimble 14 and spindle 16 rotate left and move axially to the right. The axial displacement of the spindle 16 thus caused by the rotation of the knob 15 can be read from the scale 12a provided along the longitudinal direction of the outer circumference of the head 12 and the scale 14a provided along the circumference of the thimble 14. When the thimble 14 is rotated, the spindle 16 is displaced under the coarse feed.

When the thimble 7 is rotated right, the cylinder 8 rotates right and is displaced axially to the left within the female thread 1a of the sleeve 1. Since relative rotation of the sleeve 1 and the cylinder 9 is prevented by the pin 10 and the key groove 9b, rightward rotation of the cylinder 8 causes the cylinder 8 to move axially to the left on the male thread 9a of the cylinder 9. Thus upon the thimble 7 being turned one revolution to the right, the cylinder 8 moves axially left in FIG. 1 and at the same time the cylinder 9 also moves axially to the left. However, since the pitch of the male thread 8a of the cylinder 8 is slightly larger than the pitch of female thread 8b, the cylinder 9 will be displaced axially to the left, a distance equal to the difference in the thread pitches. As a result the spindle 16 is also displaced axially to the left under fine feed, a distance equal to this difference in the thread pitches.

Conversely, when the thimble 7 is turned one revolution to the left, the spindle 16 will be displaced rightward in FIG. 1 just by the amount of this difference in the thread pitches. The displacement of the spindle 16 caused by such operation of the thimble 7 can be read from the scales 4,6.

In the present embodiment in which the smaller the pitch difference between the screws 1a,8a and the screws 8b,9a, the smaller can be the displacement of the spindle 16 caused by one revolution of the thimble 7. Thus, a fine feed of the spindle 16 can be realized by selecting this pitch difference sufficiently smaller than the pitch of the thread 16c of the spindle 16.

In this embodiment, the screws 1a,8a,8b and 9a are all right-handed, the thread pitches of the screws 1a,8a are made larger than those of the screws 8b,8a and their actions are explained. However, various kinds of fine feed and coarse feed are possible by variously changing the winding direction of thread and thread pitches, which are listed in the following Table.

A second screw which locks the screw 30 is threaded on the same axis as the first screw 30. The first screw 30 has an integral key tip 32 which fits in the key groove 29. The second screw 31 presses on first screw 30. 33 is a second thimble fixed to one end of the spindle 28.

| | hand direction of thread 8a(22a) | hand direction of thread 8b(25a) | thread pitch | | moving direction of spindle 16(28) due to the right rotation of thimble 7(23) | moving direction of spindle 16(28) due to the rotation of thimble 7(23) (sum or difference of thread pitches of threads 8a(22a), 8b(25a) are shown.) | | movement of spindle 16(28) due to the rotation of thimble 14(33) |
|---|---|---|---|---|---|---|---|---|
| | | | thread 8a(22a) | thread 8b(25a) | | | | |
| 1 | right | right | large | small | left | difference | (fine movement) | coarse movement |
| 2 | " | " | small | large | right | " | (") | " |
| 3 | left | left | large | small | " | " | (") | " |
| 4 | " | " | small | large | left | " | (") | " |
| 5 | right | " | (same pitch) | | " | sum | (coarse movement) | fine movement |
| | | | large or small | small or large | | | | |
| 6 | " | " | (same pitch) | | right | " | (") | " |
| | | | small or large | large or small | | | | |
| 7 | left | right | (same pitch) | | " | " | (") | " |
| | | | large or small | small or large | | | | |
| 8 | " | " | (same pitch) | | left | " | (") | " |
| | | | small or large | large or small | | | | |

Figure 2:
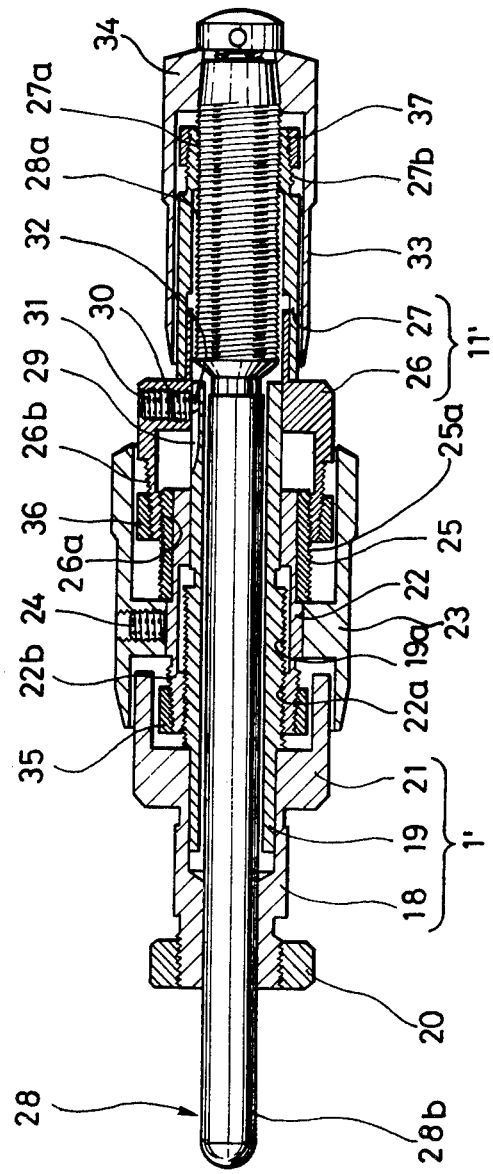

In FIG. 1 embodiment, the fourth thread 8a and the fifth thread 8b are provided within the inner or outer circumference of the cylinder 8 of the first thimble, but this arrangement is not restrictive. As illustrated in FIG. 2, the fourth thread and the fifth thread can be separately provided along the longitudinal direction of the first thimble 7. In this case, the advantage is that the diameter of the whole instrument of the present invention is made small, whereby the operator can easily grip it.

In FIG. 2, the first sleeve 1' comprises a stationary cylinder 18 and a cylinder 19, one end of which is fixed within the cylinder 18. Cylinder 18 has a nut 20 screwed on one end for fixing the first sleeve 1' and has a large-diameter part 21 at the other end. Cylinder 19 has an external or male thread 19a as a first thread. Male thread 19a engages a female thread 22a as a fourth thread formed on the inside surface of a cylinder 22 which constitutes part of a first thimble 23. The tubular first thimble 23 is rotatably relative to and has an end which extends around the large-diameter part 21. The first thimble 23 is fixed to the cylinder 22 by means of the set screw 24.

A tube 25 is fixed to the outside of cylinder 22 axially apart from a female thread 22a. Tube 25 has a male or fifth thread 25a with a pitch different from that of the female thread 22a. The male thread 25a of this tube 25 constitutes part of the first thimble 23 and engages a female thread 26a, formed on the inside surface of a cylinder 26 constituting part of a second sleeve 11'. The second sleeve 11' includes a cylinder 26 and a cylinder 27 fixed to the cylinder 26. A female thread 27a, i.e., a third thread, formed on the inside surface of the cylinder 27 engages a male thread 28a formed at one end of the spindle 28. The other end 28b of spindle 28 is slidable and rotatable through the stationary cylinder 18.

A key groove 29 is formed on the outside of cylinder 19. A first screw 30 is threaded radially into cylinder 26.

Second thimble 33 is rotated around the cylinder 27.

The large-diameter part 21 of the stationary cylinder 18 has an axial scale (not shown) like scale 4 of FIG. 1, and the first thimble 23 has a circumferential scale (not shown) like scale 6 of FIG. 1 to give the readings of the axial displacement of the spindle 28 caused by the rotation of the first thimble 23.

Cylinder 27 has an axial scale and second thimble 33 has a circumferential scale (not shown) to give the readings of the displacement of the spindle 28 caused by the rotation of the knob 34 of the second thimble 33. Cylinder 22 has a tapered male thread 22b on the outside of the portion with the female thread 22a; and a taper thread nut is screwed onto the taper thread 22b. The portion of cylinder 22 with the taper thread 22b has an axial slit which extends to the left extreme of the cylinder 22. This arrangement facilitates assembly and the elimination of thread backlash. The cylinder 26 also has a taper thread 26b with a slit (not shown) and a taper thread nut 36 is screwed on taper thread 26b. Similarly the right extreme of the cylinder 27 has a taper thread 27b which is slit and a taper threaded nut 37 is screwed on taper thread 27b.

In a measuring instrument thus constituted, when the first thimble 23 is rotated one revolution, the cylinder 22 turns and moves axially on the cylinder 19 a distance equal to one pitch of the threads 19a,22a, while at the same time the cylinder 26 moves axially on the cylinder 22 a distance equal to one pitch of the threads 25a,26a. If the threads 19a,22a are of the same hand as the threads 25a,26a, the spindle 28 will move axially a distance precisely equal to the difference in pitch between the threads 19a,22a and the threads 25a,26a. If the threads 19a,22a are of opposite hand to the threads 25a,26a, the spindle 28 will axially move a distance equal to the sum of one pitch of threads 19a,22a and one pitch of threads 25a,26a. The results of varied thread winding directions and thread pitches in the embodiment are shown in the foregoing Table.

When the knob 34 is rotated one turn, the spindle 28 moves axially a distance equal to one pitch of the threads 27a, 28a.

As described above, the arrangement according to the present invention is such that the threaded spindle extends slidably through the first sleeve and the second sleeve; the thread of the spindle engages the second sleeve; and the first and the second sleeves are connected together by the first thimble which threadedly engages the two sleeves. Under this arrangement a fine or coarse feed of the spindle is possible because of the thread engagement between the first thimble and the first sleeve and the first thimble and the second sleeve. Thus the present invention has the advantages of providing both a fine and a coarse feed of the spindle with simplicity and exactness and of increasing the axial range of movement of the spindle without increasing the total length of the device.

What is claimed is:

1. A measuring instrument comprising:
   a first sleeve provided with a first thread and fixed to a frame;
   a second sleeve axially displaceable along the axial direction of the first sleeve without rotation with respect to the first sleeve, said second sleeve having second and third threads;
   a spindle with a second thimble, said spindle being screwed to the third thread and displaceable along its axial direction with respect to the second sleeve, and its stem extending through the first sleeve and the second sleeve; and
   a first thimble displaceable with respect to the first sleeve and having a fourth thread screwed to the first thread and a fifth thread screwed to the second thread.

2. The measuring instrument of claim 1, wherein the first thread and the second thread are of the same hand and have different thread pitches.

3. The measuring instrument of claim 1, wherein the first thread and the second thread are of opposite hand.

4. The measuring instrument of claim 1, wherein the first thread is provided on the inside surface of the first sleeve, and the second thread is provided on the outer surface of the second sleeve, and the fourth thread screwed to the first thread is provided on the outer surface of the first thimble and the fifth thread screwed to the second thread is provided on the inner surface of the first thimble, said fourth and fifth threads being positioned in the diameter direction of the first thimble.

5. The measuring instrument of claim 1, wherein the first thread is provided on the outer surface of the first sleeve, the second thread is provided on the inner surface of the second sleeve, and the fourth thread screwed to the first thread is provided on the inner surface of the first thimble, the fifth thread screwed to the second thread is provided on the outer surface of the first thimble, and the fourth thread and the fifth thread are disposed apart in the axial direction of the first thimble.

6. The measuring instrument of claim 1, wherein a means is provided for preventing the rotation of the first sleeve and the second sleeve and comprises a key groove provided on the side of the second sleeve, and a rotational preventing pin on the first sleeve and extending into said key groove.

7. The measuring instrument of claim 1, wherein a means is provided for preventing the rotation of the first sleeve and the second sleeve and comprises a key groove provided on the side of the first sleeve and a rotational preventing key on the second sleeve and fitting in said key groove.

8. The measuring instrument of claim 1 wherein the frame to which the first sleeve is fixed comprises the frame of a projector.

* * * * *

UNITED STATES PATENT AND TRADEMARK OFFICE
Certificate

Patent No. 4,174,575                                  Patented November 20, 1979

Kiyohiro Nakata

Application having been made by Kiyohiro Nakata, the inventor named in the patent above identified, and Newport Corp., a Nevada corporation, the assignee, for the issuance of a certificate under the provisions of Title 35, Section 256, of the United States Code, adding the name of Norman S. Hughes as a joint inventor, and a showing and proof of facts satisfying the requirements of the said section having been submitted, it is this 28th day of June 1983, certified that the name of the said Norman S. Hughes is hereby added to the said patent as a joint inventor with the said Kiyohiro Nakata.

Fred W. Sherling,
*Associate Solicitor*